Nov. 1, 1938.   M. ALLEN   2,135,378
DISPENSER
Filed Jan. 10, 1938
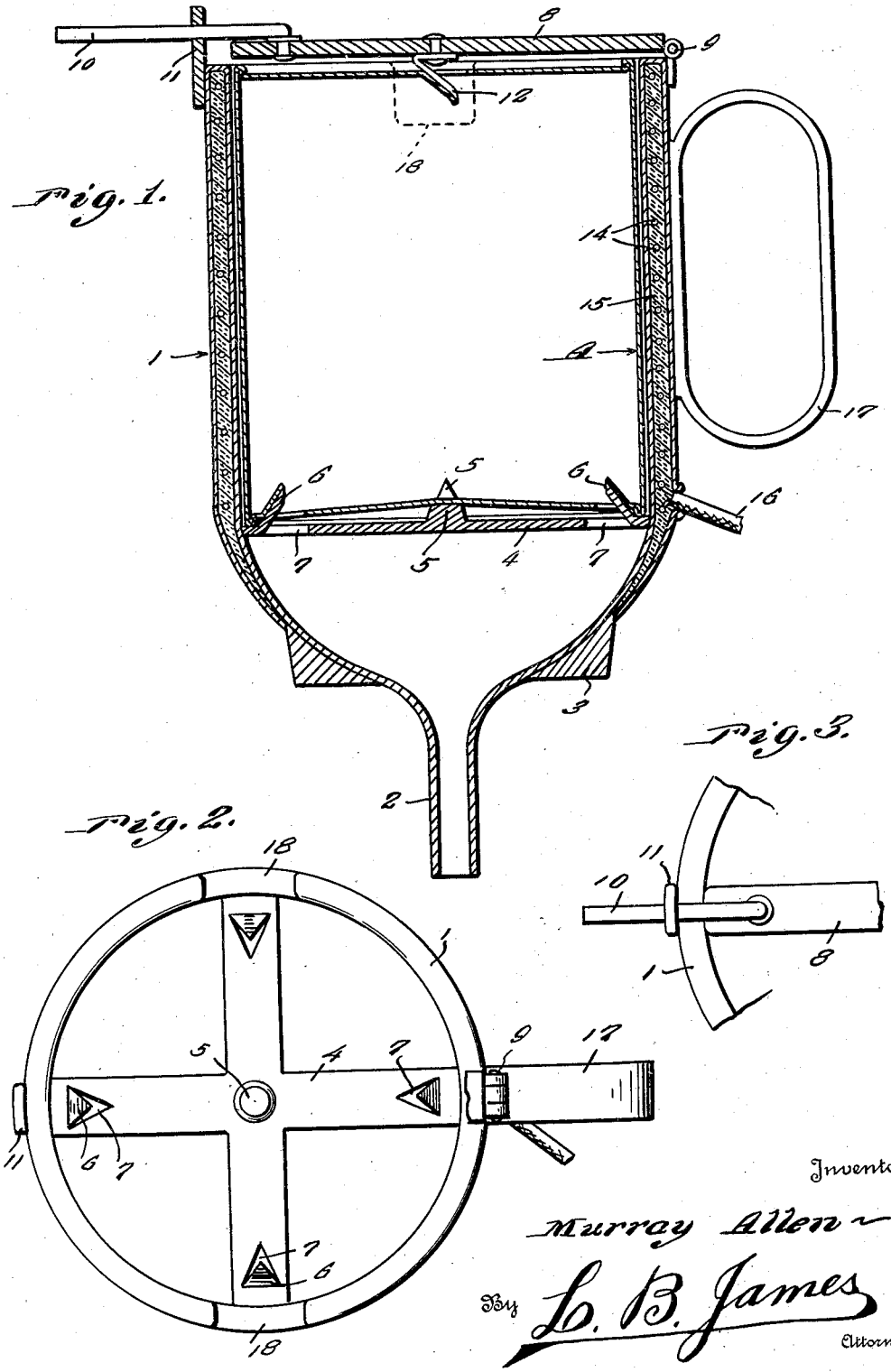
Inventor
Murray Allen
By L. B. James
Attorney Patented Nov. 1, 1938

2,135,378

UNITED STATES PATENT OFFICE 2,135,378

DISPENSER

Murray Allen, Raleigh, N. C.

Application January 10, 1938, Serial No. 184,334

4 Claims. (Cl. 221—23)

This invention relates to a funnel, the general object of the invention being to provide the funnel with means for punching holes in a container placed in the funnel, to permit the contents of the container to flow therefrom into the funnel and to permit air to enter the container to replace the fluid flowing therefrom.

Another object of the invention is to provide electric heating means in the funnel for heating the container so that the contents will flow more readily therefrom.

The invention also consists in certain other features of construction, combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Fig. 1 is a longitudinal sectional view of the invention.

Fig. 2 is a top plan view of the invention with the top member removed.

Fig. 3 is a fragmentary top plan view showing the latch means for the top member.

In these views, the numeral 1 indicates the body of the funnel which is formed with a cylindrical major portion and a downwardly tapering bottom portion ending in a tubular discharge part 2. A seat forming part 3 is formed on, or connected with, the tapered portion, for forming an annular shoulder for resting on a member into which the contents of the container are to be poured, such as the inlet spout of the crank-case of a motor.

A spider 4, formed of flat stock, extends across the lower part of the cylindrical portion and has a pointed member 5 at its center and triangular tongues 6 are punched from the end portions of the arms of the spider to form upwardly extending penetrating members and openings 7 at the tongues.

A top member 8 is hinged to the top of the funnel, as shown at 9 and a latch member 10 is pivoted to the member and is adapted to engage the keeper member 11, which projects upwardly from the funnel and has a slot therein to receive the latch member to hold the same in a position over the top of the funnel. A downwardly inclined penetrating member 12 is fastened to the under side of the member 8.

Thus when a can or container A is placed in the funnel and the member 8 swung downwardly the bottom of the container is penerated by the tongues 6 and the bottom raised by the member 5 and at the same time the member 12 punches a hole in the top of the container. Thus the contents of the container will flow from the holes made in its bottom by the tongues and the raised bottom will cause all the contents to flow towards the sides and thus escape through the holes made by the tongues. At the same time air can enter the container to replace the fluid flowing from the container. By having the holes 7 in the arms of the spider, said arms will not interfere with the flow of fluid from the holes formed by the tongues. By providing the seat forming member 3, the funnel will be supported on the member receiving the contents of the container, so the attendant can do other jobs and need not wait for the container to empty itself.

An electric coil 14 is placed in insulation material 15 which is placed between double walls of the cylindrical part of the funnel and this coil may be connected by the conductors 16 with a source of electric supply so the contents of the container can be heated to make the flow more rapid. This heating means is especially useful in cold weather or where the contents are of such a nature as to be slow of movement.

A handle 17 is connected with a side part of the funnel, as shown. Notches 18 are formed in the top of the funnel so the container can be gripped by the hands of the attendant in removing the same from the funnel.

It is thought from the foregoing description that the advantages and novel features of the invention will be readily apparent.

It is to be understood that changes may be made in the construction, combination and arrangement of the several parts, provided such changes fall within the scope of the appended claims.

What I claim and desire to protect by Letters Patent is:

1. A funnel of the class described having a body part for receiving a container, means in the funnel and adjacent the sides thereof for punching holes in the bottom of the container adjacent the sides of the container, a top member for the funnel and means carried thereby for punching a vent hole in the top of the container, and means for bulging the bottom of the container inwardly to cause the contents to flow towards the holes punched therein.

2. A funnel of the class described having a body part for receiving a container, means in the funnel adjacent the sides thereof for punching holes in the bottom of the container adjacent the sides thereof, means in the funnel for bulging the bottom of the container inwardly to cause the contents to flow toward the holes punched therein, and a seat forming part at the bottom of the funnel and above the discharge end thereof, said seat forming part having a flat bottom portion surrounding the discharge end for resting on a member receiving the contents of the container.

3. A funnel of the class described comprising a body part for receiving a container and a spout forming lower part, a spider in the lower part of the body portion having pointed tongues punched upwardly from the end parts of its arms for punching holes in the bottom of the container, a center projection carried by the spider for bulging the bottom of the container upwardly, a top member hinged to the top of the funnel, a penetrating member carried by the top member for punching a vent hole in the top of the container and a seat forming part on the lower portion of the funnel for supporting the funnel on the member receiving the contents of the container.

4. A funnel of the class described comprising a body part for receiving a container and a spout forming lower part, a spider in the lower part of the body portion having pointed tongues punched upwardly from the end parts of its arms for punching holes in the bottom of the container, a center projection carried by the spider for bulging the bottom of the container upwardly, a top member hinged to the top of the funnel, a penerating member carried by the top member for punching a vent hole in the top of the container and a seat forming part on the lower portion of the funnel for supporting the funnel on the member receiving the contents of the container and electric heating means carried by the funnel for heating the contents of the container.

MURRAY ALLEN.